United States Patent

Dahl

[11] Patent Number: 6,061,991
[45] Date of Patent: May 16, 2000

[54] DECK SYSTEM

[76] Inventor: Michael E. Dahl, 424 Woodside Ave., Hinsdale, Ill. 60521

[21] Appl. No.: 08/950,652

[22] Filed: Oct. 15, 1997

[51] Int. Cl.$^7$ ........................................ E04C 3/36
[52] U.S. Cl. ..................... 52/720.2; 52/263; 52/650.3; 256/21; 256/59; 256/65; 403/252; 403/263
[58] Field of Search ...................... 52/263, 208.1, 52/715, 720.2, 727, 650.3; 256/19, 21, 59, 63–66; 403/252, 263

[56] References Cited

U.S. PATENT DOCUMENTS

| | | | |
|---|---|---|---|
| 3,506,243 | 4/1970 | Seiler | 256/59 |
| 3,596,880 | 8/1971 | Greenberg . | |
| 3,615,110 | 10/1971 | Fugate | 287/20.95 |
| 3,620,505 | 11/1971 | Murdock . | |
| 3,918,686 | 11/1975 | Knott et al. | 256/59 |
| 3,955,799 | 5/1976 | Lauzier | 256/21 |
| 3,973,756 | 8/1976 | Lauzier | 256/21 |
| 4,014,520 | 3/1977 | Walters | 256/22 |
| 4,027,855 | 6/1977 | Lauzier | 256/21 |
| 4,146,212 | 3/1979 | Lermer . | |
| 4,279,529 | 7/1981 | Lande et al. . | |
| 5,035,401 | 7/1991 | Solter | 256/19 |
| 5,340,087 | 8/1994 | Turner . | |
| 5,516,472 | 5/1996 | Laver . | |
| 5,625,995 | 5/1997 | Martin | 52/715 |
| 5,771,646 | 6/1998 | DeSouza | 52/263 |

FOREIGN PATENT DOCUMENTS 92088  10/1961  Denmark .

Primary Examiner—Carl D. Friedman
Assistant Examiner—Yvonne M. Horton
Attorney, Agent, or Firm—Jenner & Block

[57] ABSTRACT

A deck system provides an easy to install deck by using unique columns, rails and planks. The columns can house electrical components. The rails enable quick assembly because they do not require additional fasteners or tools to install the balusters. The planks include a novel tongue-in-groove assembly that allows the planks to expand without damaging the deck.

15 Claims, 5 Drawing Sheets

DECK SYSTEM

BACKGROUND OF THE INVENTION

1. Field of the Invention

The invention relates generally to deck systems, and more particularly, to a deck system having unique columns, rails and planks that provide an easy to install, weatherable and attractive deck.

2. Description of the Related Art

Deck systems and railings are well known in the art. However, existing deck systems and railings have drawbacks which can make the already labor-intensive job of deck installation time-consuming and expensive. For example, the balusters or pickets used in most existing systems require tools at the work site for installation. Thus, U.S. Pat. Nos. 5,340,087 to Turner, 4,146,212 to Lermer, 3,918,686 to Knott et al., 3,596,880 to Greenberg and 3,506,243 to Seiler all disclose railing systems requiring screws, pins or rods to hold the balusters or pickets in place. Denmark Patent No. 92088 discloses a similar type of railing system. Use of such fasteners adds expense to a project, requires use of tools by the installer to fasten the balusters in place and is time consuming.

Similarly, U.S. Pat. No. 3,620,505 to Murdock uses a pair of wedges to lock a baluster into place within a top and bottom rail. However, once again, a tool is required on site to drive the wedges to the proper location through a hole in the rail. The system disclosed in U.S. Pat. No. 3,955,799 to Lauzier takes a different approach to solving this problem. Rather than requiring that the installer use a tool and fasteners to fasten the balusters into place, Lauzier discloses doing more pre-installation work on the balusters themselves. In particular, Lauzier teaches machining the otherwise uniformly shaped balusters to create four notches or grooves in each baluster to be used in the installation of the balusters. These notched balusters then are inserted into the rails on site without the use of an additional tool. Because this approach requires specially designed balusters which themselves have now become labor intensive, this is a less than optimal solution to the problem.

Thus, it would be desirable to have a railing system wherein easy-to-manufacture (e.g., uniform throughout their length) balusters are inserted into the top and bottom rails without requiring that the installer have additional tools for the installation. Ideally, the installation would be relatively quick and easy.

In addition, none of the aforementioned systems are shown to be used in the railing for a deck and to house electrical wiring to provide power to electrical components housed, e.g., in the columns for the railing system.

Problems also exist with the deck planks used to form the surfaces of decks. For example, when deck planks are made of wood or a wood fiber composite, such as Strandex® wood fiber composite available from Strandex Corporation of Madison, Wisconsin (a compound of wood fiber, polyethylene, thermoset resins and other minor additives—see U.S. Pat. No. 5,516,472, the contents of which are hereby incorporated by reference), these planks can expand in their widths over time due to moisture absorption. Thus, for example, where tongue-in-groove type planks are used, neighboring planks may expand into one another. The expansion can be large enough to cause damage or even ruin a deck. This is an expensive problem. Therefore, it would be desirable to have a deck system that uses deck planks that reduce or eliminate this problem.

SUMMARY OF THE INVENTION

The deck system of the present invention reduces or eliminates many of the aforementioned problems. A deck in accordance with the present invention can include a railing system that has balusters that are easy to manufacture and easy to install on site without any additional tools. This can lead to significant time and cost savings. In addition, the railing system can be used to house electrical wiring for electrical components, such as lights or stereo equipment, which can be built right into the deck, e.g., in the columns. A deck in accordance with the present invention also includes deck planks made with a novel tongue-in-groove structure that reduces or eliminates the damage caused by expansion of the deck planks.

A deck system in accordance with the present invention generally includes a plurality of columns, at least one top rail segment, a top rail support means, a bottom support means, a means for attaching the top rail segment to two of the columns, a means for attaching the bottom support means to two of the columns and a plurality of deck planks. The columns can be hollow and each column can have at least one recessed flute on its exterior. Each column also can have a plurality of internal bosses extending inwardly from the exterior and can have a support tube centrally located between the internal bosses. The column can have a plurality of exterior walls, each of which can define a recessed flute. A top rail segment extends between two of the columns. The top rail segment includes a top rail cap and a body defining a top rail upper channel. Wiring can be housed within the top rail upper channel and can be fed to an electronic component housed within one of the columns. The top rail cap is dimensioned to fit over the body along the top rail upper channel.

Means can be provided for attaching or removably attaching the top rail cap to the body. The body of the top rail segment also can define a top rail lower channel and can have a generally H-shaped perimeter. A top rail support means is provided for supporting the top rail segment. The top rail support means can be, e.g., a plurality of balusters extending from the top rail segment to the bottom support means. The balusters may be hollow or solid. A bottom support means is provided for supporting the top rail support means. A spacer can be inserted in the bottom support means between successive balusters. A spacer also can be inserted in the top rail lower channel between successive balusters. The bottom support means can include a bottom rail segment extending between successive columns. The bottom rail segment can define a bottom rail upper channel and a bottom rail lower channel. Finally, the deck system includes means for attaching the top rail segment to two of the columns and means for attaching the bottom support means to two of the columns.

The means for attaching the top rail segment can include a top angle bracket and a bottom angle bracket, each of which has a plate for attachment to one of the columns and a flange for attachment to the body. The plates and flanges can be substantially planar. The plate and the flange of each bracket can be substantially perpendicular. The plate for the top angle bracket can define an opening adjacent the top rail upper channel. The means for attaching the bottom support means can include a bottom angle bracket that can be identical to the bottom angle bracket used with the top rail segment.

The planks used in the deck can have an elongated body defining a groove on one side and can have a tongue protruding from the body on a side opposite from the groove. The tongue and the groove can extend throughout the length of the plank. The groove receives the tongue from an adjacent plank. A tab extends into the groove to abut the tongue upon initial insertion. A cavity can be provided behind the tab. When the planks expand, the tongue can crack the tab and force it into the cavity. In this way, the plank can maintain the tongue from an adjacent plank in a first initial position and then, after expansion, in a second position.

Thus, the deck system of the present invention provides a deck that is relatively easy to install. The deck system also reduces or eliminates many of the problems associated with existing deck systems.

DETAILED DESCRIPTION OF THE PREFERRED EMBODIMENT

Figure 1:
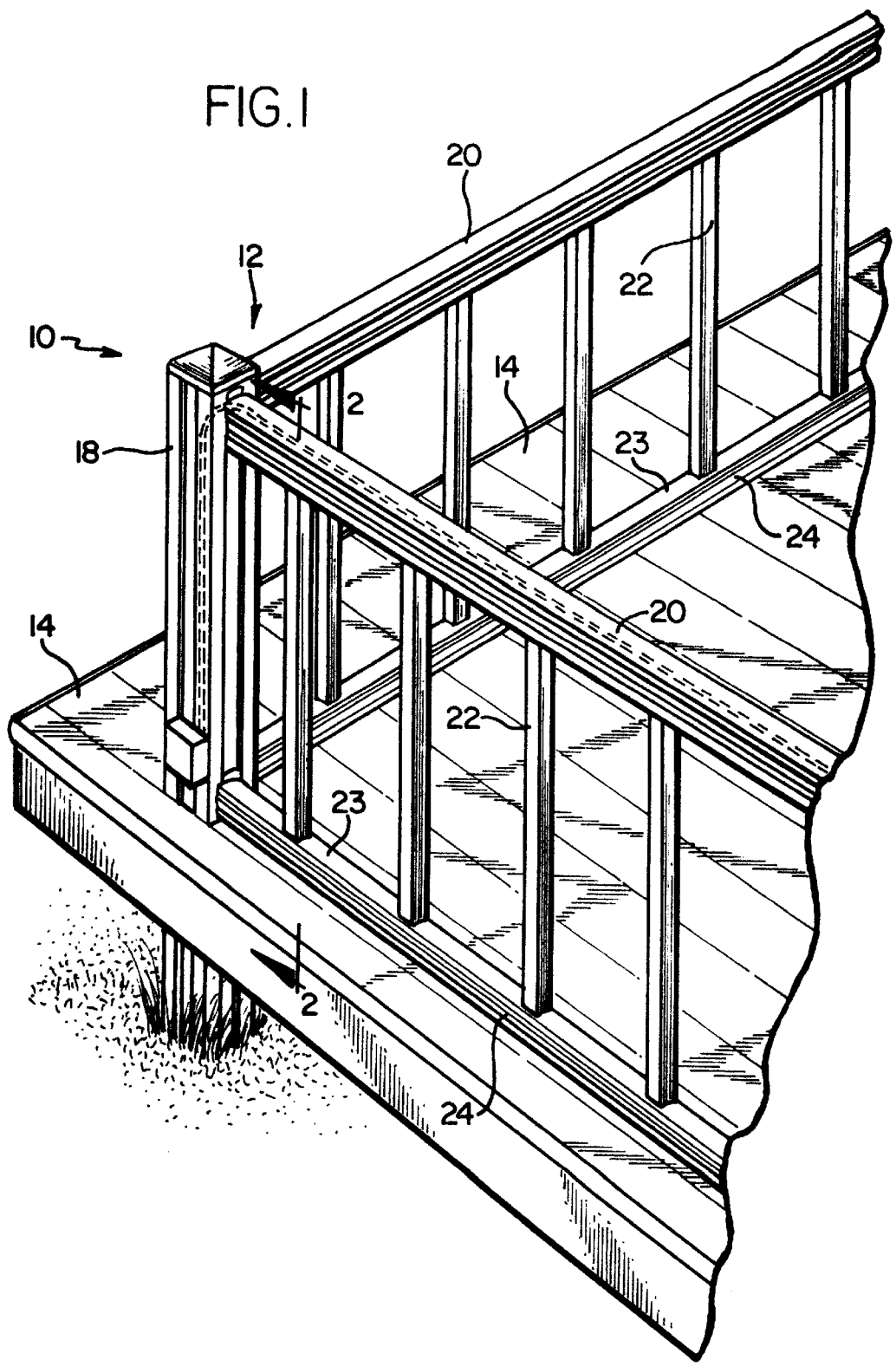
FIG. 1 is a perspective view of a portion of a deck in accordance with the present invention.
Figure 4:
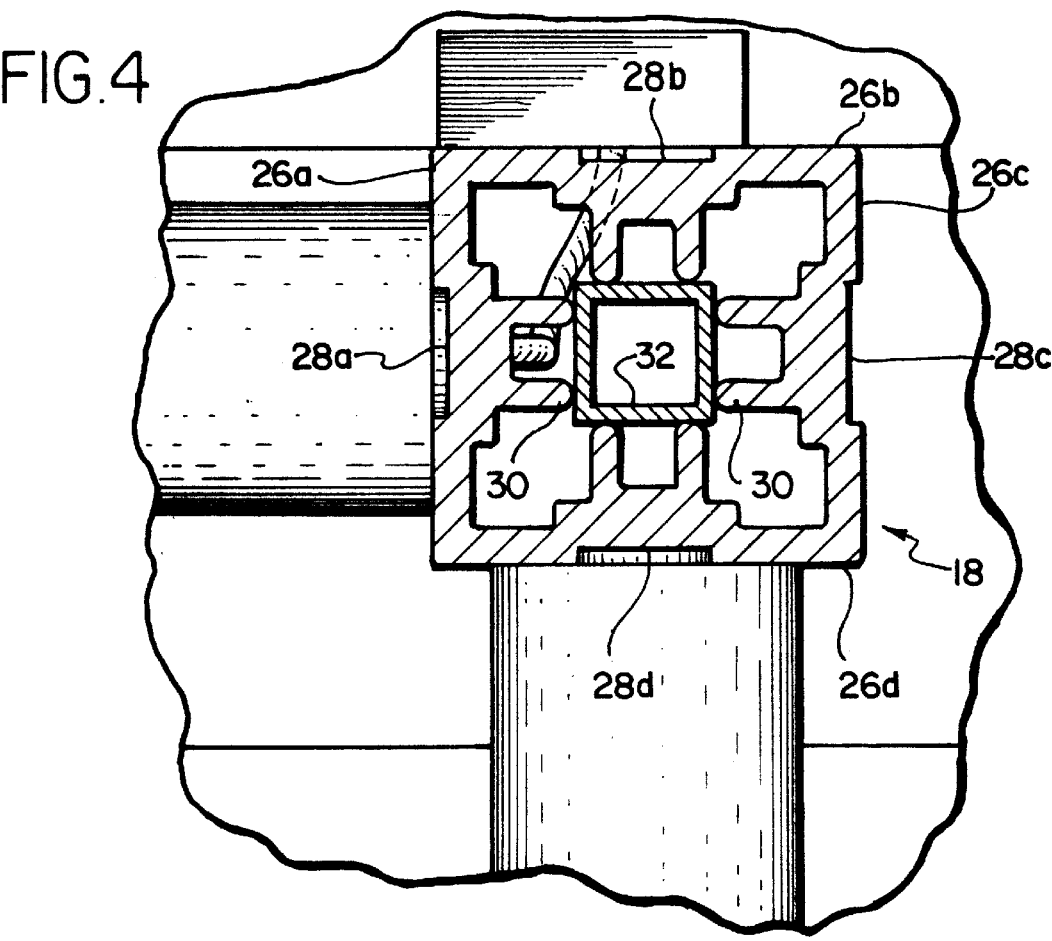
FIG. 4 is a section view along line 4—4 of FIG. 3.

Referring first to FIG. 1, there is shown a portion of a deck system 10 generally comprising a railing system 12 and deck planks 14. Railing system 12 comprises columns 18, top rail segments 20, balusters 22 for supporting top rail segment 20, spacers 23 for aligning and maintaining proper spacing of balusters 22, and bottom rail segments 24. Columns 18, top rail segments 20, balusters 22, spacers 23 and bottom rail segments 24 preferably are made of Strandex wood fiber composite. As shown in FIG. 4, column 18 can have a substantially square cross-section formed by exterior walls 26a–d. Each of exterior walls 26a–d preferably defines a recessed flute 28a–d along the length of column 18. Of course, columns 18 also could be made with fewer recessed flutes, if desired. As shown in FIG. 4, column 18 preferably is hollow. Column 18 preferably includes internal bosses 30. Optionally, a support tube 32 is positioned between internal bosses 30. Support tube 32 can be made of steel and can be used, if desired, e.g., to provide additional support where a second story deck is being constructed. The top of column 18 can be closed off with a suitable cap 34, as shown in FIG. 2.

Figure 2:
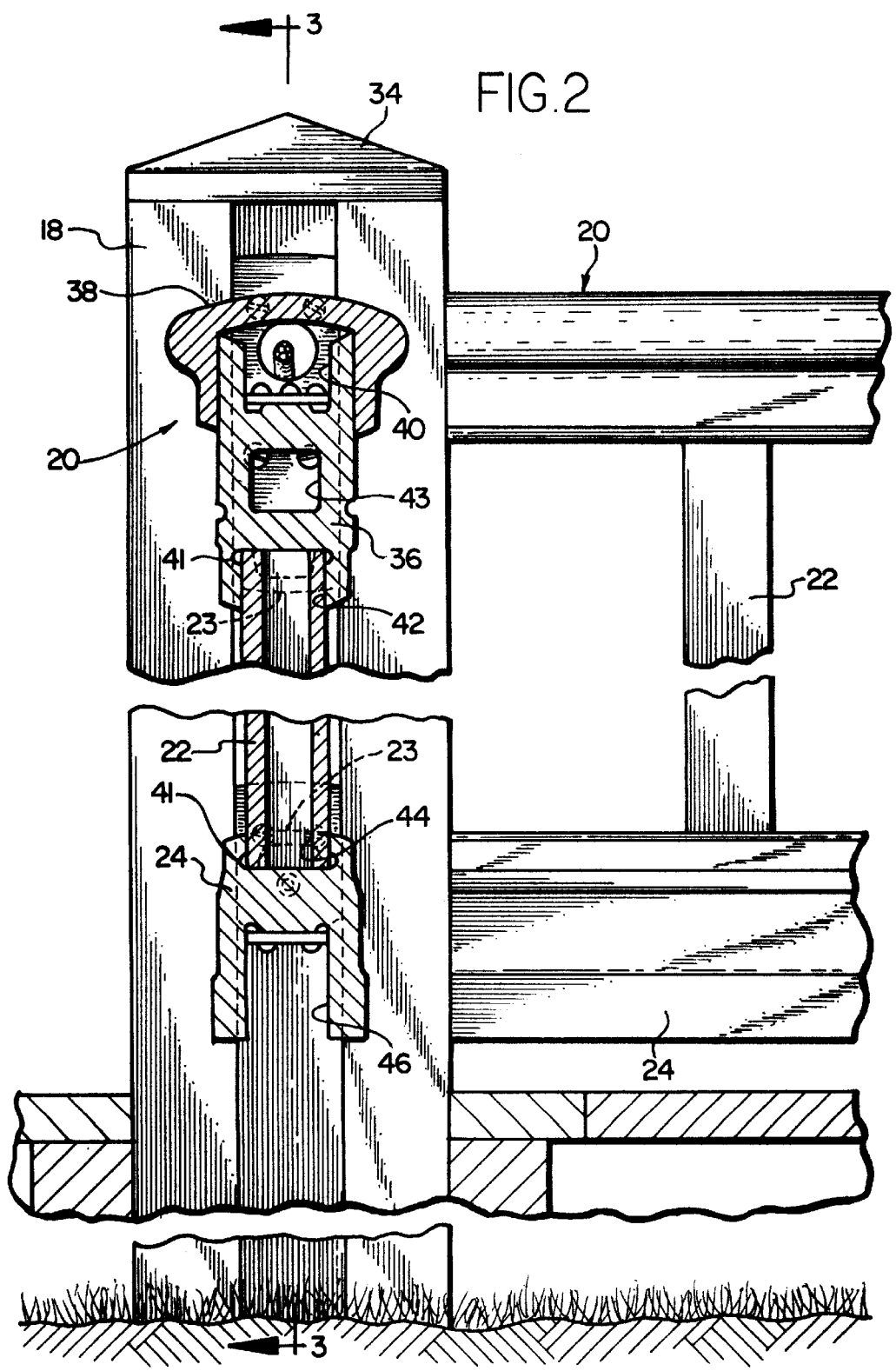
FIG. 2 is a section view along line 2—2 of FIG. 1.

Referring now to FIG. 2 in more detail, top rail segment 20 is shown. Top rail segment 20 actually comprises a body 36 that preferably is H-shaped and a top rail cap 38. Body 36 defines a top rail upper channel 40. Body 36 preferably also defines a top rail lower channel 42 which receives balusters 22. Top rail lower channel 42 preferably includes a pair of receiving grooves 41 for receiving spacers 23 between successive balusters 22. Body 36 preferably defines an opening 43 throughout its length to facilitate the extrusion of body 36.

As shown in FIG. 2, bottom rail segment 24 defines a bottom rail upper channel 44 and a bottom rail lower channel 46. Bottom rail upper channel 44 receives balusters 22. Bottom rail upper channel 44 preferably includes a pair of receiving grooves 41 for receiving spacers 23 between successive balusters 22. Bottom rail lower channel 46 is used in attaching bottom rail segment 24 to column 18 as described below. Alternatively, balusters 22 can be attached to the trim or fascia in which case bottom rail segment 24 is not necessary. Optionally, a piece of blocking made, e.g., of a baluster can be placed in the space between the deck and bottom rail lower channel 46.

Figure 7:
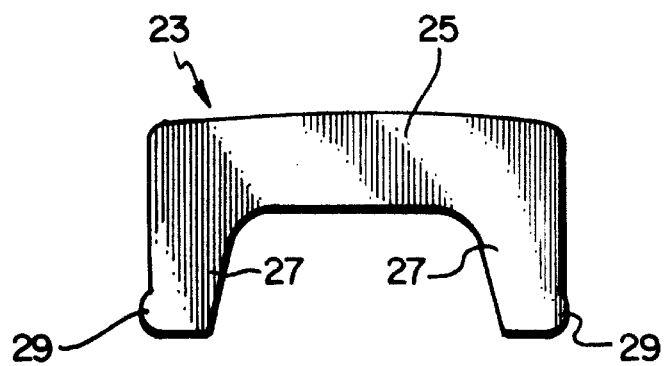
FIG. 7 is a section view of a spacer forming part of the present invention.

Turning to FIG. 7, there is shown a section view of a spacer 23. As noted above, spacers 23 preferably are used in both top rail lower channel 42 and bottom rail upper channel 44, although alternatively spacers 23 may be omitted from one, or both, of these locations. Spacer 23 is placed between successive balusters 22 to properly align and space balusters 22. Thus, once the first baluster is inserted into top rail lower channel 42 and bottom rail upper channel 44 and plumbed, the remaining balusters 22 are easily installed by simply alternately inserting spacers 23 and balusters 22. Spacer 23 has a central portion 25 and two legs 27 extending outwardly therefrom. Each leg 27 has a rounded foot portion 29 to be received in receiving grooves 41. Spacers 23 are snapped into place without tools. Spacers 23 have flat ends perpendicular to their lengths in order to properly align balusters 22.

Figure 3:
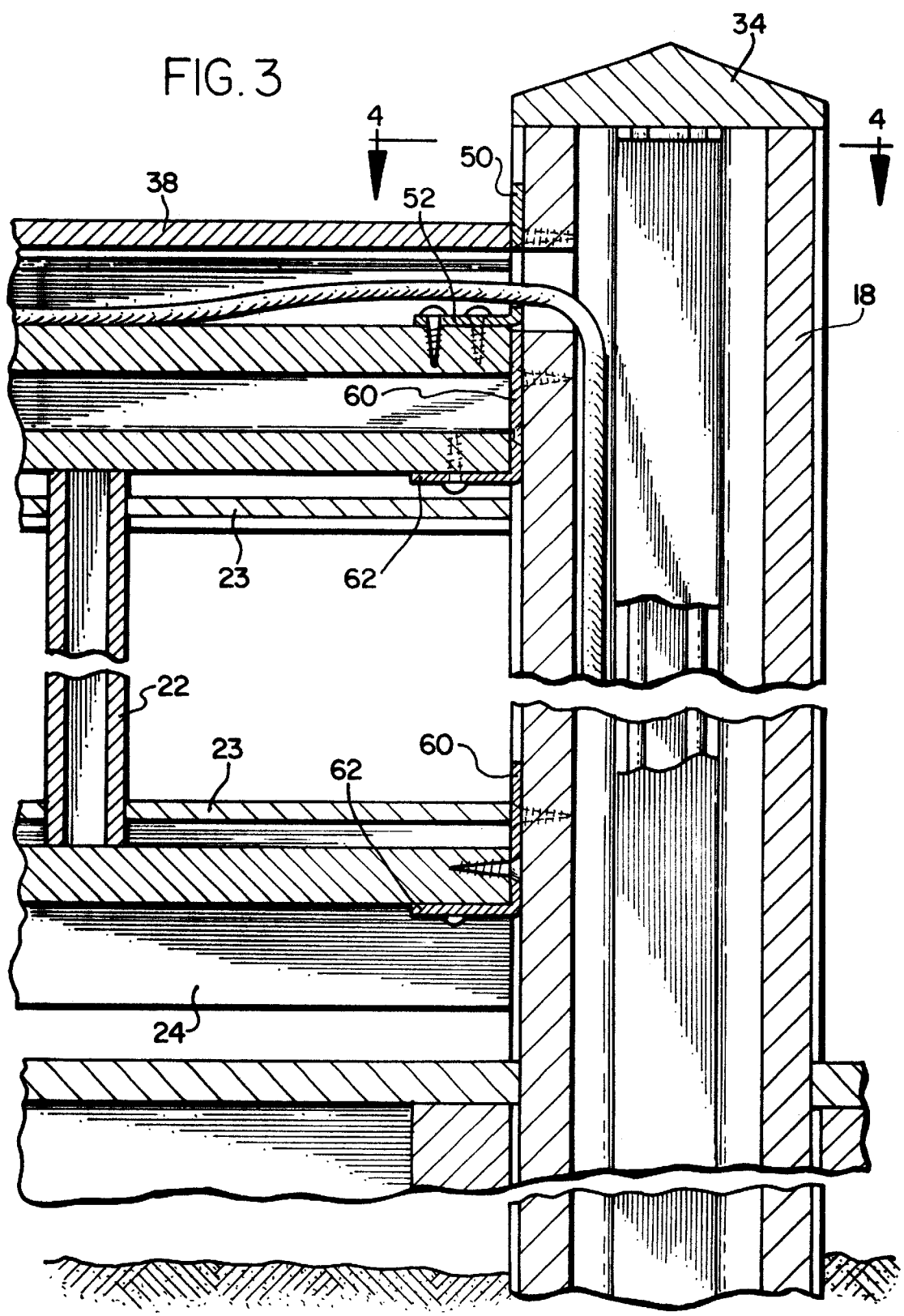
FIG. 3 is a section view along line 3—3 of FIG. 2.
Figure 6:
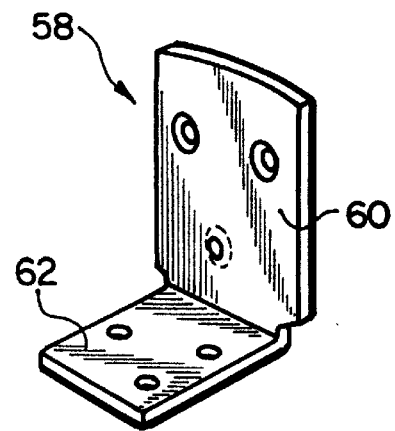
FIG. 6 is a perspective view of a bottom angle bracket for use in the present invention.

Bottom rail segment 24 is attached to column 18 using a bottom angle bracket 58 as shown in FIGS. 3 and 6. Bottom angle bracket 58 generally includes a plate 60 and a flange 62. Plate 60 and flange 62 preferably are substantially planar with flange 62 substantially perpendicular to plate 60 when bottom rail segment 24 is to extend substantially perpendicular to column 18. Flange 62 is attached in bottom rail lower channel 46 of bottom rail segment 24 by screws or other suitable means. Then, plate 60 is attached to column 18 using screws or other suitable means.

Figure 5:
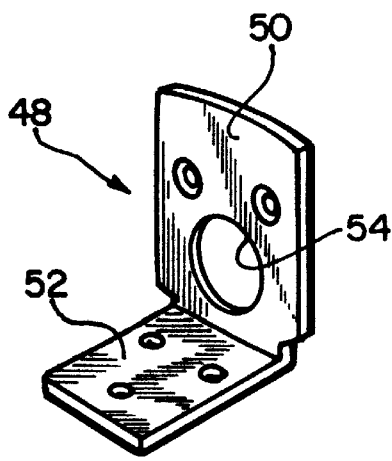
FIG. 5 is a perspective view of a top angle bracket for use in the present invention.

Top rail segment 20 is attached to column 18 via a top angle bracket 48 and a second bottom angle bracket 58 as shown in FIGS. 3, 5 and 6. Bottom angle bracket 58 is attached to column 18. Then, body 36 is placed over bottom angle bracket 58 such that bottom angle bracket 58 can be attached in top rail lower channel 42. Top angle bracket 48 includes a plate 50 for attachment to column 18 and a flange 52 for attachment to body 36. Plate 50 and flange 52 preferably are substantially planar. Plate 50 and flange 52 preferably are substantially perpendicular when body 36 is to extend substantially perpendicular to column 18. Plate 50 defines an opening 54.

Flange 52 of top angle bracket 48 is attached in top rail upper channel 40 of body 36 by screws or other suitable means known to those in the art prior to attachment of top angle bracket 48 to column 18. Then, plate 50 of top angle bracket 48 is attached to column 18 using screws or other suitable attachment means.

Figure 8:
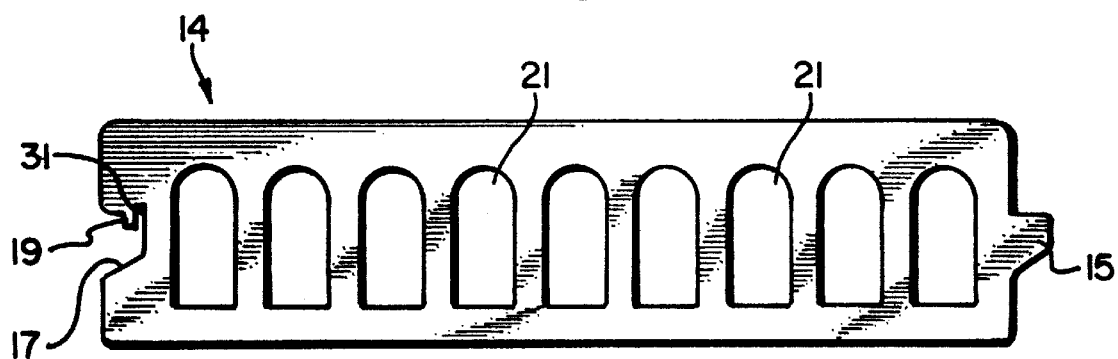
FIG. 8 is a section view of a plank forming part of the present invention.

Turning now to FIG. 8, there is shown a section view across the width of a plank 14 that can be used to construct a deck in accordance with the present invention. Plank 14 can include a number of apertures 21 extending throughout its length. Plank 14 can be a tongue-in-groove type plank. Thus, plank 14 generally includes a tongue 15 and a groove 17 extending throughout its length. Tongue 15 is inserted into groove 17 of the adjacent plank 14 while groove 17 receives a tongue 15 from a plank 14 adjacent on the opposite side. It has been found that when plank 14 is made of Strandex wood fiber composite or wood, plank 14 may expand in its width due to, e.g., absorption of moisture.

When this happens, plank 14 may expand into the surrounding planks 14 which also are expanding. Such expansion can damage the deck.

Plank 14 of FIG. 8 has a novel structure to eliminate such damage. Plank 14 includes a small sacrificial tab 19 extending throughout the length of plank 14 into groove 17. In the FIG. 8 embodiment, a cavity 31 extends throughout the length of plank 14 above and behind tab 19. Tab 19 is spaced and sized such that tongue 15 from an adjacent plank initially snugly abuts tab 19. As planks 14 expand in their widths, tongue 15 cracks tab 19 and moves tab 19 out of the way to allow expansion of the planks 14. Tab 19 can be forced into cavity 31. In this way, planks 14 can expand without damaging the deck. Of course, numerous other spatial relationships are possible for groove 17, tab 19 and cavity 31. All that is suggested here is that tongue 15 be maintained initially in groove 17 in one position and also allow for the expansion of plank 14 such that tongue 15 is maintained in a second position.

Having described the various elements of deck system 10, a brief overview of the construction of deck system 10 now will be provided. First, columns 18 are placed into the ground and/or into conventional timber framing structure and conventional structure for supporting deck planks 14 is provided. Deck planks 14 and appropriate trim and fascia are then added. Bottom angle brackets 58 are attached to bottom rail lower channel 46 of bottom rail segment 24. Bottom angle brackets 58 then are attached to columns 18. Additional bottom angle brackets 58 are attached to columns 18 for supporting body 36 of top rail segment 20. Then, body 36 is placed on bottom angle brackets 58 such that bottom angle brackets 58 are placed into top rail lower channel 42. Bottom angle brackets 58 are then attached to body 36. Next, top angle brackets 48 are placed in top rail upper channel 40 of body 36 and attached thereto. Finally, top angle brackets 48 are attached to columns 18.

The first baluster 22 then is placed in bottom rail upper channel 44 and top rail lower channel 42. The installer then plumbs baluster 22. Once baluster 22 is plumbed, spacers 23 are inserted preferably into both top rail lower channel 42 and bottom rail upper channel 44 between baluster 22 and column 18. Spacers 23 also are placed on the other side of baluster 22 to define the distance to the next baluster 22. The next baluster 22 is inserted and placed flush with spacers 23 in top rail segment 20 and bottom rail segment 24. Because the ends of spacers 23 are flat and extend in a vertical plane, the next baluster 22 is automatically properly oriented. The remaining balusters 22 and spacers 23 are inserted in this fashion.

The installer now has an open channel in top rail segment 20 to run wiring to suitable electrical components which can be placed in columns 18 as desired. Once the electrical work is complete, top rail cap 38 can be attached over body 36 either permanently or in a way providing for removal if an electrical problem were to develop.

Thus, a new deck system has been provided which provides a weatherable and attractive way to integrate electronic components into the deck while simultaneously providing a convenient method of construction.

Whereas the present invention has been described with respect to specific embodiments thereof, it will be understood that various changes and modifications will be suggested to one skilled in the art and it is intended that the invention encompass such changes and modifications as fall within the scope of the appended claims.

What is claimed is:

1. A deck system, comprising:

a plurality of columns;

at least one top rail segment, said top rail segment extending between two of said columns and said top rail segment comprising a body defining a top rail upper channel and a top rail cap dimensioned to fit over said body along said top rail upper channel;

top rail support means for supporting said at least one top rail segment wherein said top rail support means comprises a plurality of balusters extending from said top rail segment to said bottom support means;

bottom support means for supporting said top rail support means;

means for attaching said top rail segment to two of said columns;

means for attaching said bottom support means to two of said columns;

at least one spacer inserted into said bottom support means and extending between two of said balusters; and a plurality of deck planks.

2. The deck system of claim 1 further comprising at least one spacer inserted into said top rail segment and extending between two of said balusters.

3. The deck system of claim 1 wherein said bottom support means comprises at least one bottom rail segment defining a bottom rail upper channel and wherein said at least one spacer is contained in said bottom rail upper channel.

4. A deck system, comprising:

a plurality of columns;

at least one top rail segment, said top rail segment extending between two of said columns and said top rail segment comprising a body defining a top rail upper channel and a top rail cap dimensioned to fit over said body along said top rail upper channel;

top rail support means for supporting said at least one top rail segment;

bottom supports means for supporting said top rail support means;

means for attaching said top rail segment to two of said columns;

means for attaching said bottom support means to two of said columns; and a plurality of deck planks;

wherein said body of said top rail segment further defines a top rail lower channel.

5. The deck system of claim 4 wherein said body has a generally H-shaped perimeter.

6. A deck system, comprising:

a plurality of columns;

at least one top rail segment, said top rail segment extending between two of said columns and said top rail segment comprising a body defining a top rail upper channel and a top rail cap dimensioned to fit over said body along said top rail upper channel;

top rail support means for supporting said at least one top rail segment;

bottom support means for supporting said top rail support means;

means for attaching said top rail segment to two of said columns;

means for attaching said bottom support means to two of said columns; and a plurality of deck planks;

wherein said bottom support means comprises at least one bottom rail segment, each said bottom rail segment extending between two of said columns and defining a bottom rail upper channel and a bottom rail lower channel.

7. A deck system, comprising:

a plurality of columns;

at least one top rail segment, said top rail segment extending between two of said columns and said top rail segment comprising a body defining a top rail upper channel and a top rail cap dimensioned to fit over said body along said top rail upper channel;

top rail support means for supporting said at least one top rail segment;

bottom support means for supporting said top rail support means;

means for attaching said top rail segment to two of said columns;

means for attaching said bottom support means to two of said columns; and a plurality of deck planks;

wherein said means for attaching said top rail segment comprises a top angle bracket and a bottom angle bracket, each said bracket having a plate for attachment to one of said columns and a flange for attachment to said body.

8. The deck system of claim 7 wherein each said plate is substantially planar and each said flange is substantially planar.

9. The deck system of claim 8 wherein said plate and said flange of each said bracket are substantially perpendicular to one another.

10. The deck system of claim 8 wherein said plate of said top angle bracket defines an opening adjacent said top rail upper channel.

11. A deck system, comprising:

a plurality of hollow columns, said columns having a plurality of exterior walls, each said wall defining a recessed flute and said columns further including a plurality of internal bosses;

at least one top rail segment, said top rail segment extending between two of said columns and said top rail segment comprising a body having a generally H-shaped perimeter defining a top rail upper channel and a top rail lower channel and a top rail cap dimensioned to fit over said body along said top rail upper channel;

at least one bottom rail segment, each said bottom rail segment extending between two of said columns and defining a bottom rail upper channel and a bottom rail lower channel;

a plurality of balusters extending from said top rail segment to said bottom rail segment, said balusters received within said top rail lower channel and said bottom rail upper channel;

a plurality of spacers housed within said top rail lower channel and said bottom rail upper channel and between said balusters;

at least two top angle brackets, each said top angle bracket having a plate for attachment to one of said columns within said recessed flute, said plate defining an opening adjacent said top rail upper channel, and a flange for attachment to said body;

at least a first pair of bottom angle brackets, each said bottom rail bracket having a plate and a flange, one of said first pair of bottom angle brackets attached to said bottom rail segment and the other of said first pair of bottom angle brackets attached to said body of said top rail segment; and a plurality of deck planks, each said deck plank having an elongated body defining a groove and a tongue, wherein a tab extends into said groove.

12. A method of installing a railing, comprising the steps of:

providing a pair of columns;

attaching a top rail segment and a bottom rail segment between the columns;

inserting a baluster having a substantially uniform cross section throughout its length into the top rail segment and the bottom rail segment;

plumbing the baluster;

inserting a spacer having a first end and a second end into at least one of the top rail segment and the bottom rail segment wherein the first end of the spacer is in abutting relation with the baluster;

inserting a second baluster such that the second end of the spacer is in abutting relation with the second baluster; and adding additional balusters tool free.

13. The method of claim 12 wherein said spacer inserting step comprises inserting a spacer having a central portion defining a longitudinally extending continuous wall.

14. A method of installing a railing, comprising the steps of:

providing a pair of columns;

attaching a top rail segment and a bottom rail segment between the columns;

inserting a baluster into the top rail segment and the bottom rail segment;

plumbing the baluster;

inserting a spacer having a first end and a second end into at least one of the top rail segment and the bottom rail segment such that the first end of the spacer is in abutting relation with the baluster; and inserting a second baluster such that the second end of the spacer is in abutting relation with the second baluster.

15. A method of installing a railing, comprising the steps of:

providing a pair of columns;

attaching a top rail segment and a bottom rail segment between the columns;

inserting a baluster into the top rail segment and the bottom rail segment;

plumbing the baluster;

inserting a spacer having a first end, a second end, and a central portion defining a longitudinally extending continuous wall, into at least one of the top rail segment and the bottom rail segment such that the first end of the spacer is in abutting relation with the baluster; and inserting a second baluster such that the second end of the spacer is in abutting relation with the second baluster.

* * * * *